(12) United States Patent
Saraswati et al.

(10) Patent No.: US 10,514,904 B2
(45) Date of Patent: *Dec. 24, 2019

(54) DYNAMICALLY APPLYING A PATCH TO A COMPUTER APPLICATION

(71) Applicant: Hewlett Packard Enterprise Development LP, Houston, TX (US)

(72) Inventors: Sujoy Saraswati, Bangalore (IN); Suprateeka Radhakrishna Hegde, Bangalore (IN); Deepti Kharbanda, Bangalore (IN); Abhay Padlia, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 424 days.

This patent is subject to a terminal disclaimer.

(21) Appl. No.: 15/302,107

(22) PCT Filed: Jun. 30, 2014

(86) PCT No.: PCT/US2014/044905
§ 371 (c)(1),
(2) Date: Oct. 5, 2016

(87) PCT Pub. No.: WO2015/163931
PCT Pub. Date: Oct. 29, 2015

(65) Prior Publication Data
US 2017/0147330 A1 May 25, 2017

(30) Foreign Application Priority Data

Apr. 24, 2014 (IN) .......................... 2089/CHE/2014

(51) Int. Cl.
*G06F 9/44* (2018.01)
*G06F 8/656* (2018.01)
(Continued)

(52) U.S. Cl.
CPC ............ *G06F 8/656* (2018.02); *G06F 9/4486* (2018.02); *G06F 11/3688* (2013.01)

(58) Field of Classification Search
None
See application file for complete search history.

(56) References Cited

U.S. PATENT DOCUMENTS 6,154,878 A 11/2000 Saboff
6,199,202 B1 * 3/2001 Coutant .............. G06F 9/44521
717/138

(Continued)

FOREIGN PATENT DOCUMENTS

EP 2071453 6/2009
KR 20060055752 5/2006

OTHER PUBLICATIONS

"Apply Update Without Restarting Application [closed]", Stack Exchange Inc., Mar. 28, 2013, 4 Pgs.

(Continued)

*Primary Examiner* — Insun Kang
(74) *Attorney, Agent, or Firm* — Hewlett Packard Enterprise Patent Department

(57) ABSTRACT

Some examples described herein relate to dynamically applying a patch to a computer application. An external process may be invoked to bring a target process of the computer application to a safe point. A dynamic loader may load a patch library into an address space of the target process, wherein the patch library includes a patched version of a target function or a new function. A specific function in the dynamic loader may be directed to route a function call for the target function to the patched version of the target function or the new function in the patch library.

15 Claims, 4 Drawing Sheets

(51) Int. Cl.
*G06F 9/448* (2018.01)
*G06F 11/36* (2006.01)

(56) References Cited

U.S. PATENT DOCUMENTS

| | | | |
|---|---|---|---|
| 6,199,203 B1 | 3/2001 | Saboff | |
| 6,988,263 B1* | 1/2006 | Hussain | G06F 11/323 714/E11.181 |
| 7,472,384 B1* | 12/2008 | Beloussov | G06F 8/656 717/168 |
| 7,559,058 B2 | 7/2009 | Blumfield et al. | |
| 7,784,044 B2 | 8/2010 | Buban et al. | |
| 8,607,208 B1* | 12/2013 | Arnold | G06F 8/656 717/153 |
| 8,677,348 B1* | 3/2014 | Ramanathpura | G06F 8/65 717/175 |
| 9,164,754 B1* | 10/2015 | Pohlack | G06F 8/658 |
| 9,696,989 B1* | 7/2017 | Korotaev | G06F 16/2228 |
| 9,792,112 B2* | 10/2017 | Henry | G06F 11/366 |
| 2002/0029357 A1* | 3/2002 | Charnell | G06F 8/4442 714/5.11 |
| 2002/0100036 A1* | 7/2002 | Moshir | G06F 8/62 717/173 |
| 2004/0049667 A1* | 3/2004 | McCormick, Jr. | G06F 9/322 712/233 |
| 2004/0107416 A1* | 6/2004 | Buban | G06F 8/658 717/170 |
| 2005/0177709 A1 | 8/2005 | Kim | |
| 2005/0257208 A1* | 11/2005 | Blumfield | G06F 8/65 717/168 |
| 2006/0101181 A1* | 5/2006 | Post | G06F 9/45537 710/266 |
| 2006/0294430 A1* | 12/2006 | Bunker | G06F 8/65 714/38.1 |
| 2007/0174912 A1* | 7/2007 | Kraemer | G06F 21/552 726/23 |
| 2008/0083030 A1* | 4/2008 | Durham | G06F 8/656 726/22 |
| 2009/0187725 A1* | 7/2009 | Mencias | G06F 9/44557 711/171 |
| 2012/0124581 A1 | 5/2012 | Nitta | |
| 2012/0265872 A1 | 10/2012 | Chilton | |
| 2014/0007142 A1* | 1/2014 | Brown | G06F 9/44521 719/331 |
| 2014/0229939 A1* | 8/2014 | Dias de Assuncao | G06F 8/63 718/1 |
| 2014/0282468 A1* | 9/2014 | Millett | G06F 8/65 717/170 |
| 2014/0380295 A1* | 12/2014 | Chen | G06F 8/65 717/170 |
| 2015/0199283 A1* | 7/2015 | Epstein | G06F 12/1475 711/152 |
| 2015/0220320 A1* | 8/2015 | Chen | G06F 9/44536 717/170 |

OTHER PUBLICATIONS

International Searching Authority, The International Search Report and the Written Opinion, dated Dec. 30, 2014, 9 Pages.

* cited by examiner

FIG. 1     100

DYNAMICALLY APPLYING A PATCH TO A COMPUTER APPLICATION

BACKGROUND

Computer programs installed in a computer system may be updated by applying a software patch (or patch). A software patch upon installation may provide protection against security threats, fix bugs, or generally improve the usability or performance of a computer program. Since a vulnerable computer program could cause a loss of valuable data, confidential information, downtime etc., software patches play an important role in keeping a computer program (and computer system) safe and up-to-date.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Software developers often release a series of security and feature patches to address various requirements or bugs found in the operating environment of a customer's computer systems. Most of these patch update mechanisms replace a defective binary on a target system and require a reboot or a restart of the affected computer application to bring the fix into effect. This brings the system up-to-date to the latest version of the target binary. These mechanisms are known as static patching. Thus, in static patching, a software update typically requires stopping and restarting an application. However, there are many scenarios where computer systems cannot afford to halt service. Dynamic or online patching allows a computer program of a running system to be dynamically updated with new code and data with-out requiring a reboot or downtime. Dynamic patching permits programs to be updated while they run.

The present disclosure describes dynamic patching of a computer application. The present disclosure describes dynamic patching of a computer application where an external process may be invoked to bring a target process of the computer application to a safe point (defined later in the document). A dynamic loader may load a patch library into an address space of the target process, wherein the patch library includes a patched version of a target function or a new function. A specific function in the dynamic loader may be directed to route a function call for the target function to the patched version of the target function or the new function in the patch library. In some examples, an updated Procedure Linkage Table (PLT) entry or an Official Function Descriptor (OFD) entry for a target function may be used to route a subsequent function call to a patched version of a target function or a new function in the patch library. In some examples, an initial testing operation may be performed related to the computer application to be patched to determine whether the computer application is not excluded from applying a patch.

Figure 1:
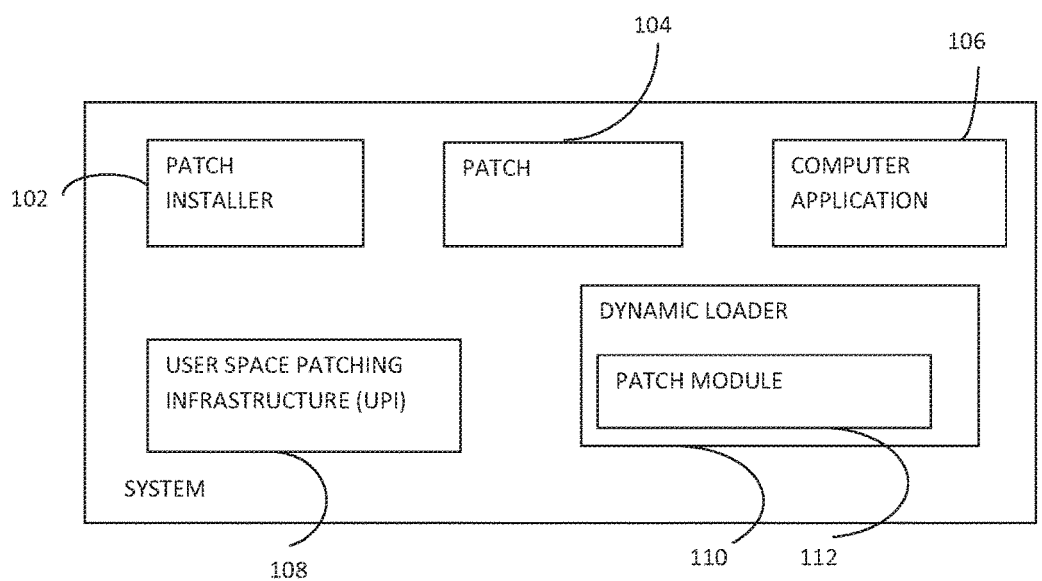
FIG. 1 illustrates a system for dynamically applying a patch to a computer application, according to an example.

FIG. 1 illustrates a system 100 for dynamically applying a patch to a computer application, according to an example. System 100 may include a patch installer 102, a patch 104, a computer application 106, a user space patching infrastructure 108, and a dynamic loader 110. In an example, the aforesaid components of system 100 may be implemented as machine-readable instructions stored on a machine-readable storage medium. The machine-readable storage medium storing such instructions may be integrated with the system 100, or it may be an external medium that may be accessible to the system 100.

System 100 may be a computing device such as a desktop computer, a server, a notebook computer, a tablet computer, a mobile phone, a personal digital assistant (PDA), and the like.

Patch installer 102 may include machine-readable instructions to apply a patch to a computer application. As mentioned earlier, dynamic or online patching allows a computer application of a running computer system to be dynamically updated with new code without requiring a reboot or downtime. In an example, the patch installer 102 may dynamically apply a patch to a computer application present in the system 100 without requiring a reboot of the system. Patch installer 102 may include all the information and data (for example, in a file) required for applying a patch to an application.

Patch 104 may include machine-readable instructions that update a computer application. For instance, patch 104 may be used to improve or fix any issues associated with a computer program. In an example, patch 104 may include a current version of a fix and metadata. In an example, a fix may include a current version of a changed function i.e. a patched version of a target function that is to be patched or a new function replacing a target function. In an example, the metadata may include a list of functions that are being patched in a target computer system, any other data (such as patch level names, etc.) that a patching infrastructure (explained below) may need for carrying out the process, and information regarding the sequence in which the higher versions of a software patch need to be installed on a target system. In an example, a patch 104 may include a patch library. The patch library may include a patched version of a target function or a new function, Computer application (or "application") 106 may include any type of software that may be implemented in the form of machine-readable instructions on a machine-readable storage medium. In an example, computer application 106 is a user space application i.e. a computer program that runs outside an operating system's kernel.

User space patching infrastructure (UPI) 108 may include machine-readable instructions to direct a user space patch application process. In an example, prior to applying a patch to a computer application (for example, 106), UPI 108 may determine whether the computer application (for example, 106) is not excluded from the patching process. In an instance, UPI 108 may first check the patch metadata and determine if the patch is for a classified application that may be excluded from applying a dynamic patch. Binary Translators and Emulators like Aries, Java Virtual Machine (JVM), and Online transaction processing (OLTP) processes are some of the example applications that may be excluded. Upon detecting an attempt to apply a dynamic patch on any of the excluded applications, UPI 108 may report an appropriate message (for example, an error message) to a user.

In an example, UPI 108 may invoke a process to externally control a target process to be patched. The external process may bring a target process to a safe point before proceeding further. A "safe point" in the context of dynamic patching may be defined to include a state of the application process where none of the functions that need to be patched exist in the application execution context. In an example, the aforesaid definition may be made available via patch metadata.

In some examples, the external process invoked by the UPI 108 to control a target process may find a function(s) that should not be there in the process execution state. These functions may be referred to as non-safe functions. The external process may use a tracing mechanism (for example, a ttrace or ptrace system call) to stop the execution of a process, examine the user space stack for all threads in the process, and verify if any of the non-safe functions is present on the stacks. If none of the non-safe functions are found on the stacks, the application process may be deemed to be at a safe point for applying a patch dynamically. Otherwise, the external process may resume the target process execution and stop it after an interval to carry out the safe point verification method again. If a predefined number of attempts to reach a safe point do not succeed, the external process may relinquish the execution control of the target process. The external process may also report such failure to a user via an appropriate message (for example, an error message). If a safe point is reached in the target process, patching may be performed while the target process is controlled by the external process. The external process, at this point, may interact with a dynamic loader (DLD) 110, which may be present in the application process context.

Dynamic loader (DLD) 110 may include machine-readable instructions which may be loaded into an application that uses shared libraries. In an example, a DLD 110 may be a shared library which is invoked automatically at startup time and loaded into a memory for program execution. A DLD 110 may load other libraries in a process. The external process, described above, may utilize this functionality of DLD 110 and load a patch library in a target process address space by executing a DLD 110 function to load a library (for example, dlopen( )or shl_load( )).

A DLD 110 may include a patch module 112 to route a function call for a target function to a patched version of a target function or a new function in a patch library. The term "module" may refer to a software component (machine executable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computing device.

In an example, in order to route a function call for a target function to a patched version of a target function or a new function in a patch library, the patch module 112 may determine whether a Procedure Linkage Table (PLT) entry or an Official Function Descriptor (OFD) entry for a target function is available in the DLD 110. A PLT entry is similar to a table entry and the same may be used to determine the address of a target function. Similarly, an OFD entry may be used to determine the address of a target function for an indirect function call. A PLT or an OFD entry may reside in the data section of a target process.

A PLT entry or an OFD entry may include a pointer to a patch library that includes the target function and an address of the target function. In response to said determination, patch module 112 may update the PLT entry or the OFD entry, as applicable, with a pointer to the patch library that includes a patched version of the target function or a new function. Patch module 112 may also update an address of the patched version of the target function or the new function in the patch library. Once a patch 104 is applied to a computer application 106, the patch module may use the updated PLT entry or the OFD entry, as the case may be, to route a subsequent function call for the target function to the patched version of the target function or the new function in the patch library.

In another example, in order to route a function call for a target function to a patched version of a target function or a new function in a patch library, the patch module 112 may determine that a Procedure Linkage Table (PLT) entry or an Official Function Descriptor (OFD) entry for the target function is not available. In response to said determination, patch module 112 may modify a text entry of the target function, and add an entry code sequence in the target function, to route a subsequent function call for the target function to the patched version of the target function or the new function in the patch library.

Figure 2:
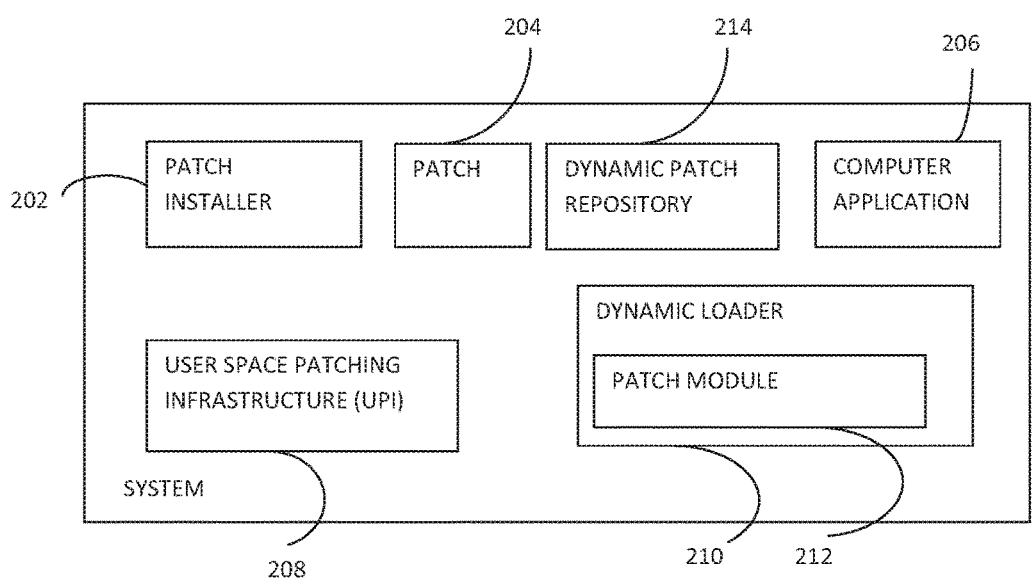
FIG. 2 illustrates a system for dynamically applying a patch to a computer application, according to an example.

FIG. 2 illustrates a system 200 for dynamically applying a patch to a computer application, according to an example. System 200 may be similar to system 100 described above. Accordingly, components of system 200 that are similarly named and illustrated in system 100 may be considered similar. In the example of FIG. 2, system 200 may include a patch installer 202, a patch 204, a computer application 206, user space patching infrastructure 208, a dynamic loader 210, a patch module 212, and a dynamic patch registry (DPR) 214. In an example, the aforesaid components of system 200 may be implemented as machine-readable instructions stored on a machine-readable storage medium. The machine-readable storage medium storing such instructions may be integrated with the system 200, or it may be an external medium that may be accessible to the system 200.

In the example of FIG. 2, the dynamic patch registry (DPR) 214 may be a repository that stores a PLT entry and/or an OFD entry of a target function before a patch is applied to such function. In an example, dynamic loader 210 may store a previous PLT and/or OFD entry of a target function in the dynamic patch registry 214 prior to application of a patch to such function. Thus, dynamic patch registry 214 may be construed as a central database that stores the PLT and/or OFD entries related to the original state of a computer application before a patch has been applied. In the event a patch rollback is required, aforesaid entries in the DPR may be used to restore a computer application to its previous state.

Figure 3:
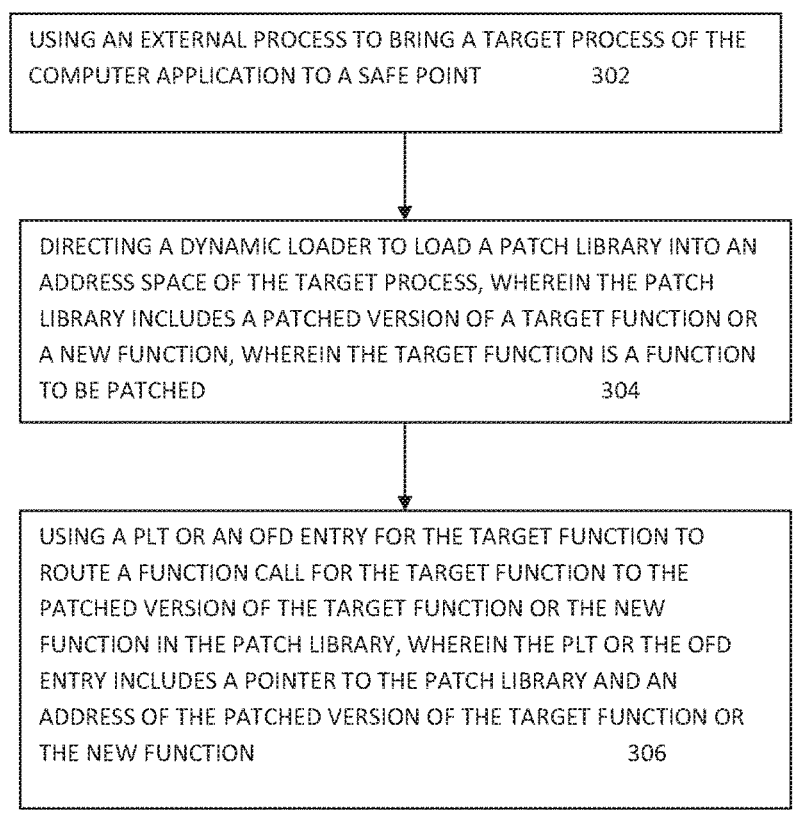
FIG. 3 illustrates a method of dynamically applying a patch to a computer application, according to an example.

FIG. 3 illustrates a method 300 for dynamically applying a patch to a computer application, according to an example.

At block 302, an external process may be used to bring a target process of a computer application (for example, 106) to a safe point. As mentioned above, a safe point may include a state of the application process where none of the functions that need to be patched exist in the application execution context. In an example, the external process may bring a target process to the safe point by allowing execution of the target process until no non-safe functions in a process execution state exist. The external process may use a tracing mechanism to temporarily stop the execution of a process, examine the user space stack for all threads in the process, and verify if any of the non-safe functions is present on the stacks. If none of the non-safe functions are found on the stacks, the application process may be deemed to be at a safe point for applying a patch to a target function. Or else, the external process may resume the target process execution and stop the same after an interval to carry out the safe point verification method again.

At block 304, once a target process of a computer application (for example, 106) reaches a safe point, a dynamic loader (for example, 110) is directed to load a patch library into an address space of the target process. The patch library may include a patched version of a target function (i.e. a function that is to be patched) or a new function that may replace the target function.

At block 306, a PLT or an OFD entry for the target function may be used to route a subsequent function call for the target function to the patched version of the target function or the new function in the patch library. As described above, a PLT entry or the OFD entry may include a pointer to the patch library and an address of the patched version of the target function or the new function. At block 306, a patch module (for example, 112) in the dynamic loader may determine whether a PLT entry or an OFD entry for the target function is available. If a PLT entry or an OFD entry for the target function is available, the patch module may update the PLT entry or the OFD entry, as applicable, with a pointer to the patch library that includes a patched version of the target function or a new function that may replace the target function. The PLT entry or the OFD entry may also be updated with the address of the patched version of the target function or the new function in the patch library. Once a patch has been applied (block 304), the patch module may use the updated PLT entry or the OFD entry, as the case may be, to route a subsequent function call for the target function to the patched version of the target function or the new function in the patch library.

In an example, if the patch module determines that a PLT entry or an OFD entry for the target function is not available, the patch module may modify a text entry of the target function and add an entry code sequence in the target function to route a subsequent function call for the target function to the patched version of the target function or the new function in the patch library.

Once all functions that are to be patched have been updated either through the updated PLT/OFD entries or by patching the entry code sequence in the original function, the external process continues the target application on where it was stopped and detaches from the application. The target application process is thus successfully patched dynamically, without a system reboot or an application restart.

Figure 4:
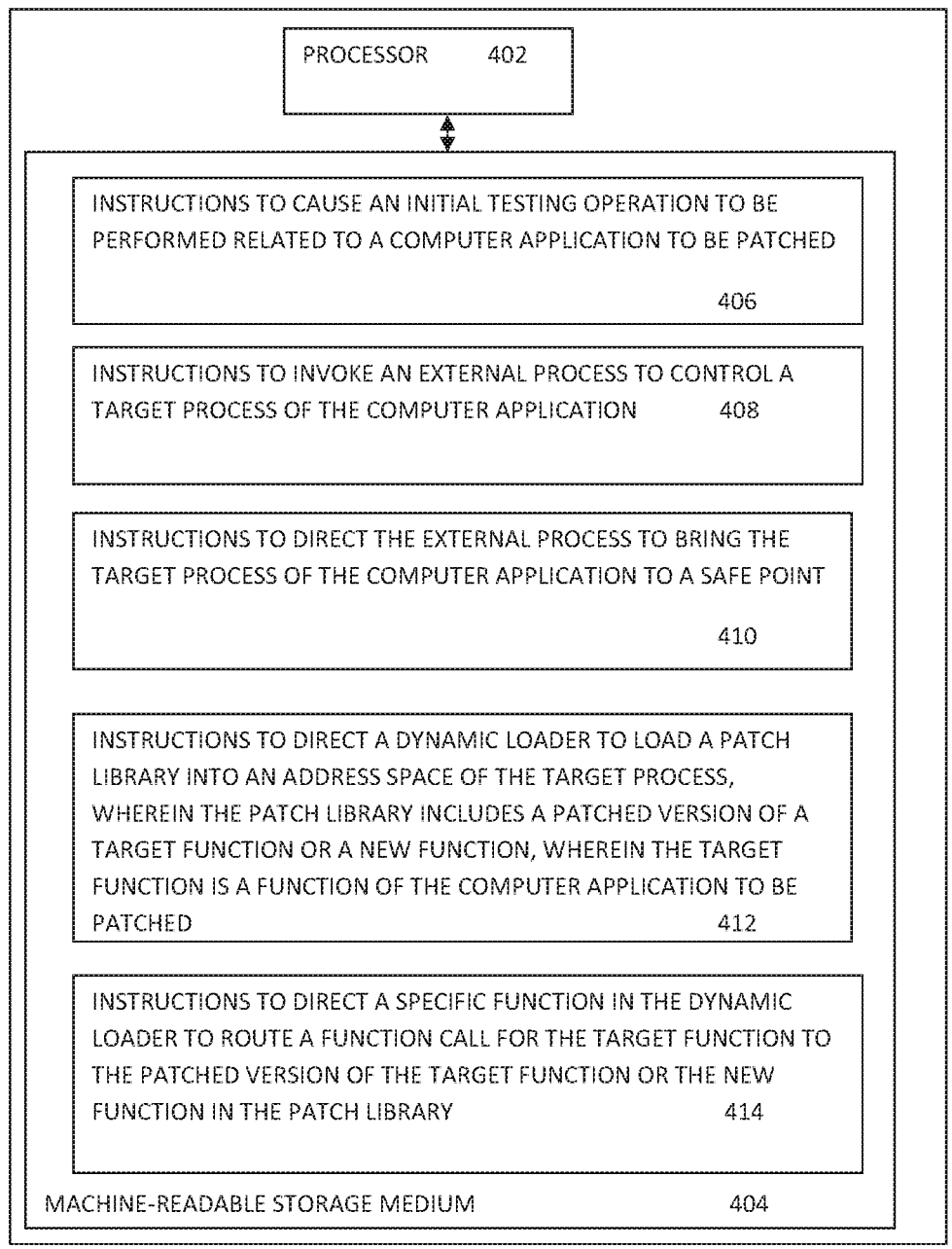
FIG. 4 illustrates a system for dynamically applying a patch to a computer application, according to an example.

FIG. 4 illustrates a system 400 for dynamically applying a software patch to a computer application, according to an example.

System 400 includes a processor 402 and a machine-readable storage medium 404 communicatively coupled through a system bus. In an example, system 400 may be analogous to system 100 of FIG. 1 or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 404 may be a non-transitory machine-readable medium. Machine-readable storage medium 404 may store monitoring instructions 406, 408, 410, 412 and 414. In an example, instructions 406 may be executed by processor 402 to cause an initial testing operation to be performed related to a computer application to be patched. In an example, the instructions to cause the initial testing operation may include instructions to determine whether the computer application is not excluded from applying a patch. In another example, the instructions to cause the initial testing operation may include instructions to determine whether the computer application is a user space computer application.

In response to the initial testing operation, instructions 408 may be executed by processor 402 to invoke an external process to control a target process of the computer application. Instructions 410 may be executed by processor 402 to direct the external process to bring the target process of the computer application to a safe point. Instructions 412 may be executed by processor 402 to direct a dynamic loader to load a patch library into an address space of the target process, wherein the patch library includes a patched version of a target function or a new function, wherein the target function is a function to be patched. Instructions 414 may be executed by processor 402 to direct a specific function in the dynamic loader to route a function call for the target function to the patched version of the target function or the new function in the patch library. In an example, the specific function may determine that a Procedure Linkage Table (PLT) entry for the target function is available. In response to the determination, the specific function may update the PLT entry for the target function upon patching of the target function. In an example, the instructions to update the PLT entry include instructions to update a pointer to a patch library that includes the target function and an address of the target function. Once the PLT entry has been updated, for a subsequent function call for the target function, the specific function may use the updated PLT entry to route the subsequent function call to the patched version of the target function or the new function in the patch library.

In another example, the specific function may determine that an Official Function Descriptor (OFD) entry for the target function is available. In response to the determination, the specific function may update the OFD entry for the target function upon patching of the target function. In an example, the instructions to update the OFD entry include instructions to update a pointer to a patch library that includes the target function and an address of the target function. Once the OFD entry has been updated, for a subsequent function call for the target function, the specific function may use the updated OFD entry to route the subsequent function call to the patched version of the target function or the new function in the patch library.

In a yet another example, the specific function may determine that a Procedure Linkage Table (PLT) entry or an Official Function Descriptor (OFD) entry for the target function is not available. In response to the determination, the specific function may modify a text entry of the target function and add an entry code sequence in the target function to route the function call for the target function to the patched version of the target function or the new function in the patch library.

For the purpose of simplicity of explanation, the example methods of FIG. 3 is shown as executing serially, however it is to be understood and appreciated that the present and other examples are not limited by the illustrated order. The example systems of FIGS. 1, 2 and 4, and method of FIG. 3 may be implemented in the form of a computer program product including computer-executable instructions, such as program code, which may be run on any suitable computing device in conjunction with a suitable operating system (for example, MICROSOFT WINDOWS, LINUX, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution.

The invention claimed is:

1. A non-transitory machine-readable storage medium comprising instructions executable by a processor to:
   cause an initial testing operation to be performed related to a computer application to be patched;
   in response to the initial testing operation, invoke an external process to control a target process of the computer application;
   determine whether the target process of the computer application is at a first execution point identified as unsafe;
   based on a determination that the first execution point is unsafe, resuming execution of the target process for an interval prior to a reexamination at a second execution point, wherein repeated executions of the target process for subsequent intervals allows the external process to bring the target process of the computer application to an execution point identified as safe; and
   subsequent to reaching the execution point identified as safe:
      direct a dynamic loader to load a patch library into an address space of the target process, wherein the patch library includes a patched version of a target function or a new function, wherein the target function is a function of the computer application to be patched; and
      direct a specific function in the dynamic loader to route a function call for the target function to the patched version of the target function or the new function in the patch library, using a pointer to the patch library and an address of the patched version of the target function or the new function.

2. The storage medium of claim 1, wherein the specific function in the dynamic loader includes instructions to:
   determine that a Procedure Linkage Table (PLT) entry for the target function is available;
   in response to the determination, update the PLT entry for the target function upon patching of the target function; and
   for the function call for the target function, use the updated PLT entry to route the function call to the patched version of the target function or the new function in the patch library.

3. The storage medium of claim 2, wherein the instructions to update the PLT entry include instructions to update the pointer to the patch library that includes the target function and the address of the target function.

4. The storage medium of claim 1, wherein the specific function in the dynamic loader includes instructions to:
   determine that an Official Function Descriptor (OFD) entry for the target function is available;
   in response to the determination, update the OFD entry for the target function upon patching of the target function; and
   for the function call for the target function, use the updated OFD entry to route the function call to the patched version of the target function or the new function in the patch library.

5. The storage medium of claim 4, wherein the instructions to update the OFD entry include instructions to update the pointer to the patch library that includes the target function and the address of the target function.

6. The storage medium of claim 1, wherein the specific function in the dynamic loader includes instructions to:
   determine that a Procedure Linkage Table (PLT) entry or an Official Function Descriptor (OFD) entry for the target function is not available; and
   in response to the determination, modify a text entry of the target function and add an entry code sequence in the target function to route the function call for the target function to the patched version of the target function or the new function in the patch library.

7. The storage medium of claim 1, wherein the instructions to cause the initial testing operation include instructions to determine whether the computer application is not excluded from applying a patch.

8. The storage medium of claim 1, wherein the instructions to cause the initial testing operation include instructions to determine whether the computer application is a user space computer application.

9. A system, comprising:
   a processor;
   a memory communicatively coupled to the processor;
   a patch installer, executed by the processor, to dynamically apply a patch to a computer application;
   a user space patching infrastructure to invoke an external process to bring a target process of the computer application to an execution point identified as safe, in part, by:
      determining whether the target process of the computer application is at a first execution point identified as unsafe; and
      based on a determination that the first execution point is unsafe, resuming execution of the target process for an interval prior to a reexamination at a second execution point, wherein repeated executions of the target process for subsequent intervals allows the external process to bring the target process of the computer application to the execution point identified as safe;
   a dynamic loader to load a patch library, subsequent to the target process reaching the execution point identified as safe, into an address space of the memory associated with the target process, wherein the patch library includes a patched version of a target function or a new function, wherein the target function is a function to be patched; and a patch module in the dynamic loader to route a function call for the target function to the patched version of the target function or the new function in the patch library, using a pointer to the patch library and an address of the patched version of the target function or the new function.

10. The system of claim 9, wherein the patch module in the dynamic loader to: determine that a Procedure Linkage Table (PLT) entry or an Official Function Descriptor (OFD) entry for the target function is available, wherein the PLT entry or the OFD entry includes the pointer to a patch library that includes the target function and an address of the target function; in response to the determination, update the PLT entry or the OFD entry, as applicable, with the pointer to the patch library that includes the patched version of the target function or the new function, and the address of the patched version of the target function or the new function in the patch library; and for the function call for the target function, use the updated PLT entry or the OFD entry, as applicable, to route the function call to the patched version of the target function or the new function in the patch library.

11. The system of claim 10, further comprising a Dynamic Patch Registry to store the PLT entry and/or the OFD entry for the target function, wherein the stored PLT entry and/or the OFD entry is used to rollback the patch applied to the computer application.

12. The system of claim 9, wherein the user space patching infrastructure is to determine from a patch metadata whether the computer application is not excluded from applying the patch.

13. A method of dynamically applying a patch to a computer application, comprising:

using an external process to bring a target process of the computer application to a safe point, in part, by:

determining whether the target process of the computer application is at a first execution point identified as unsafe; and based on a determination that the first execution point is unsafe, resuming execution of the target process for an interval prior to a reexamination at a second execution point, wherein repeated executions of the target process for subsequent intervals allows the external process to bring the target process of the computer application to an execution point identified as safe;

subsequent to reaching the execution point identified as safe, directing a dynamic loader to load a patch library into an address space of the target process, wherein the patch library includes a patched version of a target function or a new function, wherein the target function is a function to be patched; and using a Procedure Linkage Table (PTL) or an Official Function Descriptor (OFD) entry for the target function to route a function call for the target function to the patched version of the target function or the new function in the patch library, wherein the PLT or the OFD entry includes a pointer to the patch library and an address of the patched version of the target function or the new function.

14. The method of claim 13, wherein the external process brings the target process to the safe point by repeating execution of the target process for one or more execution intervals until no non-safe functions in a process execution state exist.

15. The method of claim 13, further comprising, in case the PLT or the OFD entry for the target function is unavailable, modifying a text entry of the target function and adding an entry code sequence in the target function to route the function call for the target function to the patched version of the target function or the new function in the patch library.

* * * * *